United States Patent
Liu et al.

(10) Patent No.: US 11,382,041 B2
(45) Date of Patent: Jul. 5, 2022

(54) METHODS FOR DYNAMICALLY ADJUSTING WAKE-UP TIME AND COMMUNICATION DEVICE UTILIZING THE SAME

(71) Applicant: Realtek Semiconductor Corp., HsinChu (TW)

(72) Inventors: Zhibin Liu, Suzhou (CN); Jiehong Yu, Suzhou (CN); Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/213,237

(22) Filed: Mar. 26, 2021

(65) Prior Publication Data
US 2021/0337478 A1 Oct. 28, 2021

(30) Foreign Application Priority Data
Apr. 22, 2020 (CN) .......................... 202010323602.6

(51) Int. Cl.
*H04W 52/02* (2009.01)
(52) U.S. Cl.
CPC ... *H04W 52/0248* (2013.01); *H04W 52/0258* (2013.01)
(58) Field of Classification Search
CPC .......... H04W 52/0248; H04W 52/0258; Y02D 30/70
USPC ....................................... 370/311
See application file for complete search history.

(56) References Cited

U.S. PATENT DOCUMENTS

| | | | |
|---|---|---|---|
| 9,510,289 B1 * | 11/2016 | de Ruijter | H03L 7/148 |
| 10,841,894 B1 * | 11/2020 | Siann | H04W 64/003 |
| 11,317,349 B2 * | 4/2022 | Nicols | H04W 52/0229 |
| 2008/0170551 A1 * | 7/2008 | Zaks | H04W 52/0229 370/338 |
| 2012/0250537 A1 * | 10/2012 | Shatil | H04W 52/0229 370/252 |
| 2013/0034004 A1 * | 2/2013 | Mann | H04W 52/0216 370/252 |
| 2013/0272180 A1 * | 10/2013 | Hiremath | H04W 56/0035 370/311 |
| 2014/0064166 A1 * | 3/2014 | HomChaudhuri | H04W 52/0216 370/311 |

(Continued)

FOREIGN PATENT DOCUMENTS

CN 103918324 A 7/2014

*Primary Examiner* — Robert J Lopata
(74) *Attorney, Agent, or Firm* — Winston Hsu (57) ABSTRACT

A method for dynamically adjusting wake-up time for a communication device includes: estimating a timing error for each reception in a first phase and determining a first basic correction value according to the timing errors obtained in the first phase, estimating a timing error for each reception in a second phase, updating a second basic correction value according to a trend of the timing errors and determining a first timing correction value according to the timing errors obtained in the second phase, and estimating a timing error for each reception in a third phase, updating a third basic correction value according to a trend of the timing errors recently obtained, and updating the wake-up time in the third phase according to the first timing correction value and the third basic correction value.

16 Claims, 8 Drawing Sheets

(56) References Cited

U.S. PATENT DOCUMENTS

| | | | |
|---|---|---|---|
| 2015/0036564 A1* | 2/2015 | Chen | H04W 52/0241 |
| | | | 370/311 |
| 2016/0165534 A1* | 6/2016 | Kim | H04W 74/006 |
| | | | 370/311 |
| 2019/0007902 A1* | 1/2019 | Khaled | H04W 52/0235 |
| 2019/0059055 A1* | 2/2019 | Murali | H04W 52/0229 |
| 2020/0221382 A1* | 7/2020 | Konradsson | H04W 52/0229 |
| 2021/0211979 A1* | 7/2021 | Kim | H04W 56/0055 |

* cited by examiner

METHODS FOR DYNAMICALLY ADJUSTING WAKE-UP TIME AND COMMUNICATION DEVICE UTILIZING THE SAME

BACKGROUND OF THE INVENTION

1. Field of the Invention

The invention relates to methods for dynamically adjusting wake-up time of a wireless communication device, more particular to methods for dynamically adjusting the wake-up time for waking up a receiving circuit of a wireless communication device according to a trend of error in multiple adjusting phases with different adjustment steps, so as to perform beacon frame detection more efficiently.

2. Description of the Prior Art

Wireless signal transmission is faced with interference and various attenuation factors, such as the interference from multiple wireless devices in the same channel, the interference from radio frequency source in the same frequency band, physical obstacles, excessive transmission distance, multipath effect, etc., that may deteriorate communication qualities, make the wireless signal to attenuate seriously and cause transmission delay. In addition, there may also be some clock inaccuracy (clock error) accumulated during the sleep period of the wireless communication device and some timing difference between the Timing Synchronization Function (TSF) value that the transmitting circuit of an associated Access Point (AP) actually transmits the beacon frame and the predetermined Target Beacon Transmission Time (TBTT) due to the hardware design and the environment interference.

Figure 1:
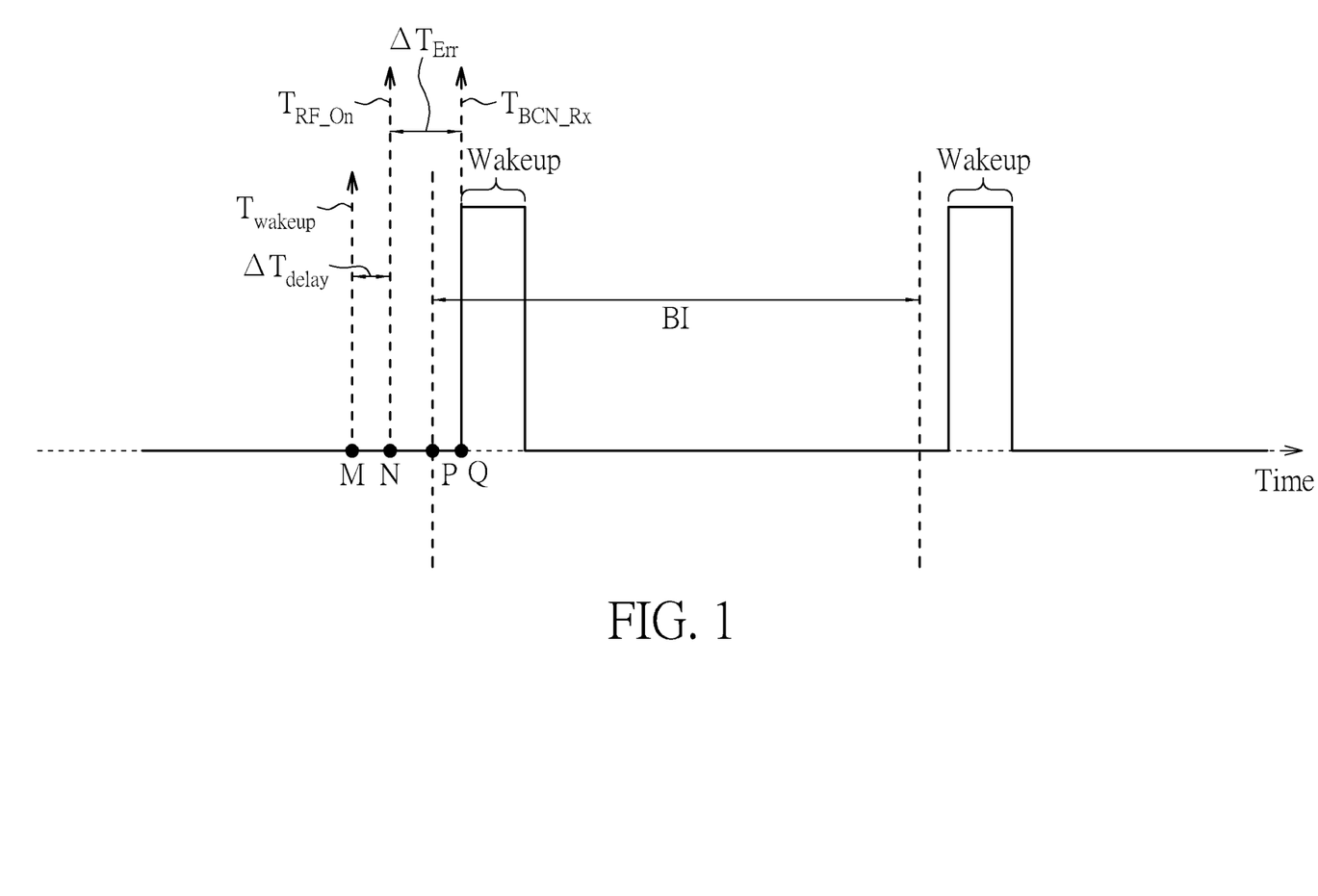
FIG. 1 is a schematic diagram showing operations of waking up the hardware circuit operating in a power-saving mode to perform the reception operation.

FIG. 1 is a schematic diagram showing operations of waking up the hardware circuit operating in a power-saving mode to perform the reception operation. In FIG. 1, the time interval with high level in the waveform represents the time interval Wakeup during which the hardware circuit is awakened to perform the receiving operation, and the time interval between two beacon frames is the Beacon Interval (BI).

The time at point P in FIG. 1 is the predetermined TBTT. The wake-up mechanism of wireless communication device is triggered by the corresponding hardware circuit at the prior time before point P. The time at point M is the time $T_{wakeup}$ when the wireless communication device is awakened. Because there is some time delay $\Delta T_{delay}$ contributed by the hardware circuits and the clock error, the time when the receiving circuit is actually turned on is the time $T_{RF\_On}$ at point N. Suppose that the time when the beacon frame is actually received by the receiving circuit of the wireless communication device is the time $T_{BCN\_Rx}$ at point Q, the timing error between the time $T_{BCN\_Rx}$ and the time $T_{RF\_On}$ is $\Delta T_{Err}$.

Ideally, the time $T_{RF\_On}$ when the receiving circuit is just turned on is preferably equal to the time $T_{BCN\_Rx}$ when the beacon frame is received. However, due to various interference factors, the timing error $\Delta T_{Err}$ is uneven, which leads to the problem of prematurely turning on the receiving circuit or loss of beacon frame. Turning on the receiving circuit prematurely and loss of beacon frame both cause excessive power consumption, and may further affect communication quality. Therefore, in the field of wireless communication, how to determine a better wake-up time to reduce the timing error is an important issue worthy to be concerned.

SUMMARY OF THE INVENTION

It is an objective of the invention to provide a method for dynamically adjusting the wake-up time for waking up a receiving circuit of a wireless communication device according to a trend of error in multiple adjusting phases with different adjustment steps, so as to solve the aforementioned problem and perform beacon frame detection more efficiently.

According to an embodiment of the invention, a communication device comprises a transceiver circuit and a processor. The transceiver circuit is configured to receive a plurality of wireless signals. The processor is configured to wake up the transceiver circuit to receive one or more beacon frames after entering a power-saving mode. In a first phase in the power-saving mode, the processor is configured to determine a plurality of wake-up time according to a beacon interval, control the transceiver circuit to perform a first number of receptions according to the determined wake-up time, estimate a timing error for each reception in the first phase and determine a first basic correction value according to the timing errors obtained in the first phase. In a second phase in the power-saving mode, the processor is configured to determine a plurality of wake-up time according to the beacon interval, the first basic correction value and a second basic correction value, control the transceiver circuit to perform a second number of receptions according to the determined wake-up time, estimate a timing error for each reception in the second phase, determines a first timing correction value according to the timing errors obtained in the second phase, wherein the processor is further configured to update the second basic correction value according to a trend of the timing errors recently obtained. In a third phase in the power-saving mode, the processor is configured to determine a plurality of wake-up time according to the beacon interval, the first timing correction value and a third basic correction value, control the transceiver circuit to perform a third number of receptions according to the determined wake-up time, estimate a timing error for each reception in the third phase, and update the third basic correction value according to a trend of the timing errors recently obtained, wherein the processor is further configured to update the wake-up time in the third phase according to the first timing correction value and the third basic correction value.

According to another embodiment of the invention, a method for dynamically adjusting wake-up time for a communication device comprising a transceiver circuit and a processor, wherein the communication device enters a power-saving mode when a predetermined condition is met, and the method comprises: in a first phase in the power-saving mode, determining a plurality of wake-up time according to a beacon interval, performing a first number of receptions according to the determined wake-up time, estimating a timing error of the transceiver circuit for each reception in the first phase and determining a first basic correction value according to the timing errors obtained in the first phase, wherein the transceiver circuit is awakened at the wake-up time in the first phase to receive one or more beacon frames; in a second phase in the power-saving mode, determining a plurality of wake-up time according to the beacon interval, the first basic correction value and a second basic correction value, performing a second number of receptions according to the determined wake-up time, estimating a timing error of the transceiver circuit for each reception in the second phase, updating the second basic correction value according to a trend of the timing errors recently obtained and determining a first timing correction value according to the timing errors obtained in the second phase, wherein the transceiver circuit is awakened at the wake-up time in the second phase to receive one or more beacon frames; and in a third phase in the power-saving mode, determining a plurality of wake-up time according to the beacon interval, the first timing correction value and a third basic correction value, performing a third number of receptions according to the determined wake-up time, estimating a timing error of the transceiver circuit for each reception in the third phase, updating the third basic correction value according to a trend of the timing errors recently obtained, and updating the wake-up time in the third phase according to the first timing correction value and the third basic correction value, wherein the transceiver circuit is awakened at the wake-up time in the third phase to receive one or more beacon frames.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
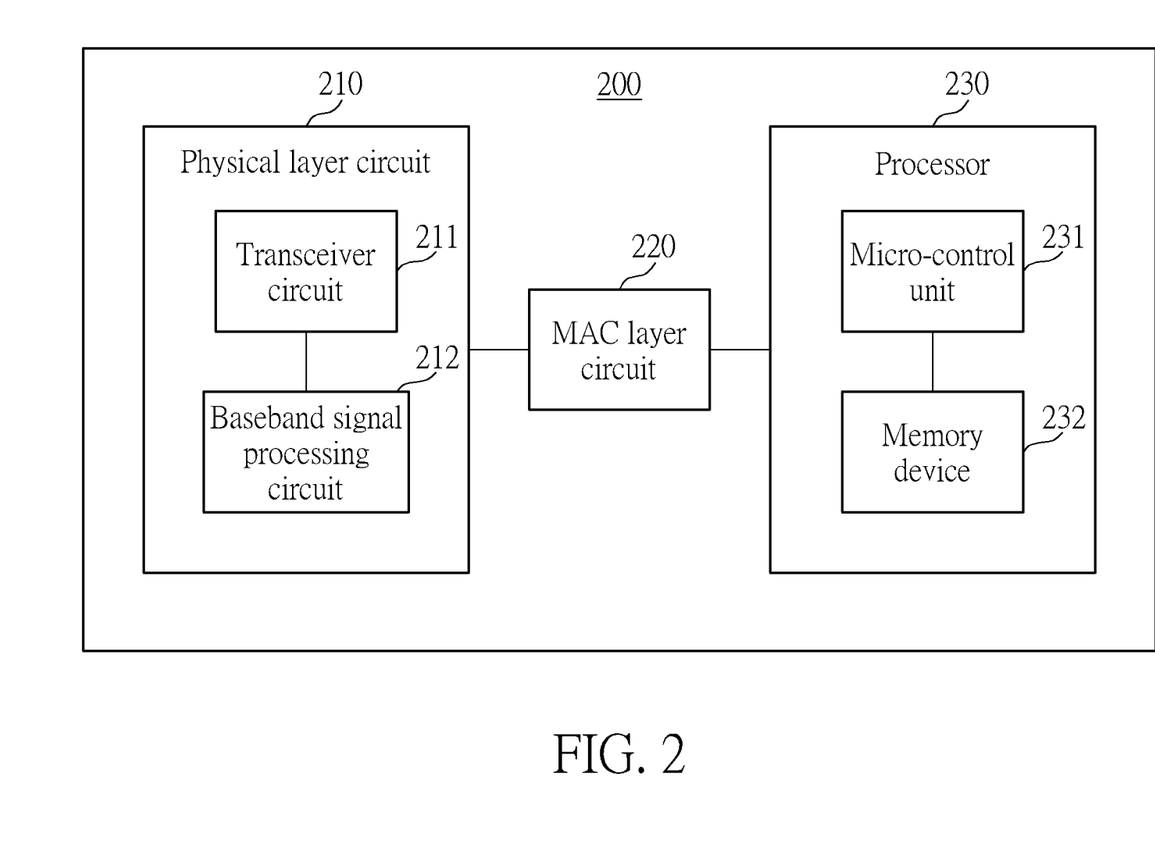
FIG. 2 is a schematic diagram of a communication device according to an embodiment of the invention.

FIG. 2 is a schematic diagram of a communication device according to an embodiment of the invention. The communication device 200 may comprise a physical layer circuit 210, a media access control (MAC) layer circuit 220 and a processor 230. The physical layer circuit 210 may comprise at least a transceiver circuit 211 and a baseband signal processing circuit 212. The processor 230 may at least comprise a micro-control unit 231 and a memory device 232. It should be noted that FIG. 2 presents a simplified block diagram of a communication device in which only the components relevant to the invention are shown. As will be readily appreciated by a person of ordinary skill in the art, a communication device may further comprise other components not shown in FIG. 2 and configured for implementing the functions of wireless communication and related signal processing.

The transceiver circuit 211 may comprise at least one antenna for transmitting and receiving a plurality of wireless signals, and may comprise hardware circuits such as one or more amplifiers and filters for further processing the wireless signals to be transmitted and the wireless signals received from the air interface. The baseband signal processing circuit 212 may comprise hardware circuits such as one or more mixers, amplifiers and filters for performing up conversion and down conversion of the signals, signal amplifying and filtering. The MAC layer circuit 220 may operate in compliance with the commands issued by the processor 230 and the corresponding communication protocol. For example, the MAC layer circuit 220 may generate corresponding instructions to notify the baseband signal processing circuit 212 or the transceiver circuit 211 to perform corresponding operations. The micro-control unit 231 may access the memory device 232 and generate corresponding instructions to control operations of the physical layer circuit 210 and the MAC layer circuit 220 by executing the software and firmware codes programmed in the memory device 232.

Figure 3:
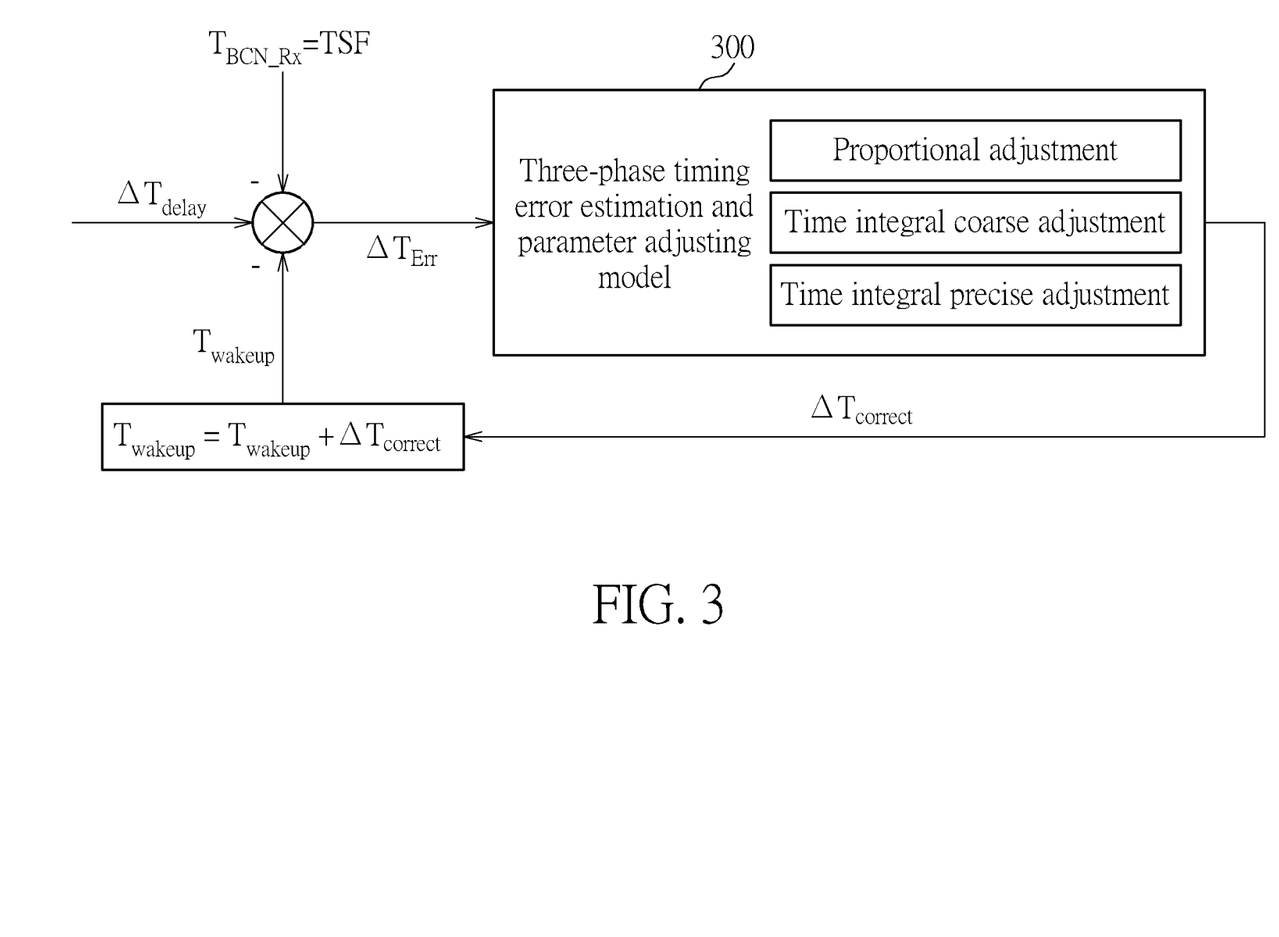
FIG. 3 is a schematic diagram showing the concept of the proposed method for dynamically adjusting the wake-up time of a receiving circuit of the communication device according to an embodiment of the invention.

Referring to FIG. 1, due to the uncertainties of transmission channel, the timing error $\Delta T_{Err}$ is an unknown and random value. Large timing error $\Delta T_{Err}$ will lead to excessive power consumption, and may even cause loss of beacon frame and affecting the communication quality. To solve this problem, methods for dynamically adjusting the wake-up time for waking up a receiving circuit of a communication device according to a trend of error in multiple adjusting phases with different adjustment steps are proposed, so as to perform beacon frame detection more efficiently FIG. 3 is a schematic diagram showing the concept of the proposed method for dynamically adjusting the wake-up time of a receiving circuit (for example, the transceiver circuit 211 shown in FIG. 2) of the communication device according to an embodiment of the invention. In the embodiment of the invention, the processor 230 may perform the timing error estimation and parameter adjustments in three phases, comprising proportional adjustment in the first phase, time integral coarse adjustment in the second phase and time integral precise adjustment in the third phase. In the embodiments of the invention, referring back to FIG. 1, suppose that the signal time difference in the propagation path is ignored, the TSF value read by the transceiver circuit 211 for time calibration at the time point Q when the first byte of the beacon frame is actually received can be regarded as the time $T_{BCN\_Rx}$ when the beacon frame is received, where the TSF value is usually carried in the data body of the beacon frames.

In the embodiments of the invention, the absolute timing error $\Delta T_{Err}$ is taken as the input of the parameter adjusting model 300, and the data sources that are usable for parameter adjustment comprise the time $T_{BCN\_Rx}$ and $T_{wakeup}$ and the time delay $\Delta T_{delay}$ contributed by the hardware circuits and the clock error as shown in FIG. 1, and the relationship between these values can be derived as the following equation Eq. (1):

$$\Delta T_{Err} = T_{BCN\_Rx} - T_{wakeup} - \Delta T_{delay} \quad \text{Eq. (1)}$$

where the time delay $\Delta T_{delay}$ may be obtained by performing some tests after the communication device has been manufactured.

According to an embodiment of the invention, the processor 230 may input the absolute timing error $\Delta T_{Err}$ into the parameter adjusting model 300 so as to estimate the timing correction value $\Delta T_{correct}$, and may repeatedly use the latest estimated timing correction value $\Delta T_{correct}$ to correct the wake-up time $T_{wakeup}$ for each beacon reception. The relationship between the wake-up time $T_{wakeup}$ and the timing correction value $\Delta T_{correct}$ is shown as the following equation Eq. (2):

$$T_{wakeup} = T_{wakeup} + \Delta T_{correct} \qquad \text{Eq. (2)}$$

where the wake-up time $T_{wakeup}$ before correction may be derived from the Target Beacon Transmission Time (TBTT), which is a known value. For example, the wake-up time $T_{wakeup}$ may be set as 5 milliseconds (ms) before the TBTT time.

Figure 4:
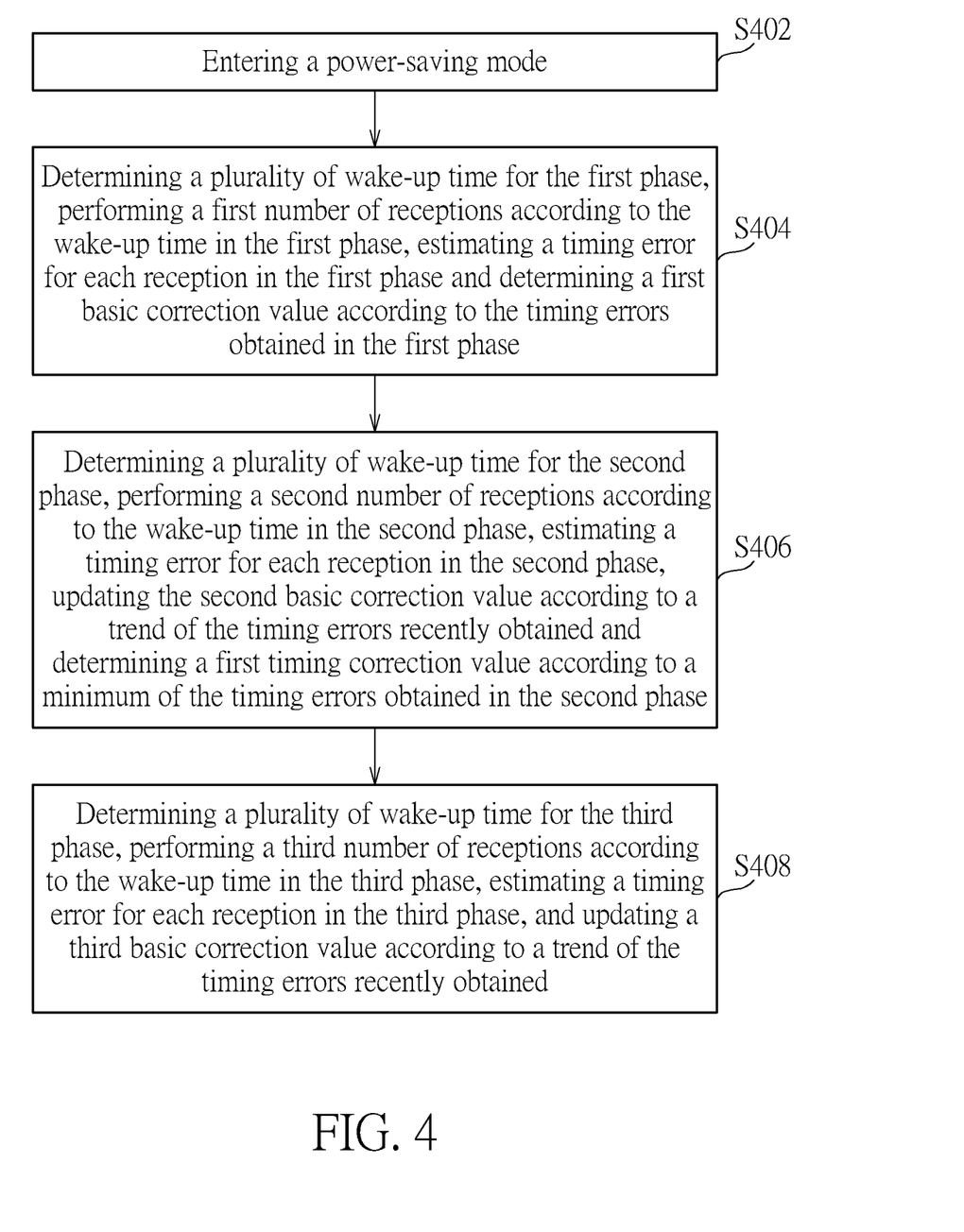
FIG. 4 is flow chart of the method for dynamically adjusting wake-up time for waking up a transceiver circuit of a communication device to perform beacon reception according to an embodiment of the invention.

FIG. 4 is flow chart of the method for dynamically adjusting wake-up time for waking up a transceiver circuit of a communication device to perform beacon reception according to an embodiment of the invention. The proposed method for dynamically adjusting wake-up time is applicable for a communication device, such as the communication device 200 shown in FIG. 2, and comprises the following steps:

Step S402: Entering a power-saving mode. Generally, to reduce power consumption, the communication device may enter a power-saving mode when one or more predetermined conditions is/are met. For example, the communication device may agree on parameters such as beacon interval (BI) and listening interval with an associated access point (AP), and the predetermined condition may be, for example, there is no data transmission between the communication device and the AP for at least a predetermined time period. When the predetermined condition is met, the communication device enters the power-saving mode. Before the power-saving mode is entered, the processor 230 may execute the corresponding software codes to identify the aforementioned parameters, such as the BI and listening interval, and may determine a plurality of TBTT time for waking up the physical layer circuit 210 later according to the BI and listening interval, so as to wake up the physical layer circuit 210 at predetermined time in the power-saving mode to receive the periodically broadcasted beacon frames. According to an embodiment of the invention, after the power-saving mode is entered, the processor 230 may operate in the first phase in the power-saving mode.

Step S404: determining a plurality of wake-up time for the first phase, performing a first number (e.g. n1 times) of receptions, estimating a timing error for each reception in the first phase and determining a first basic correction value according to the timing errors obtained in the first phase. To be more specific, the processor 230 may determine a plurality of wake-up time in the first phase in the power-saving mode according to the aforementioned TBTT time. The physical layer circuit 210 (including the transceiver circuit 211) may be repeatedly awakened according to the wake-up time in the first phase to receive a beacon frame. The physical layer circuit 210 may perform reception during the time interval Wakeup after being awakened, and then enter the power-saving mode again (e.g. sleep again) after the reception as shown in FIG. 1. When each reception is completed, the processor 230 may estimate a corresponding timing error. For example, the processor 230 may estimate the corresponding timing error according to the equation Eq. (1) illustrated above. According to an embodiment of the invention, when the first number n1 of receptions are completed, the processor 230 may determine the first basic correction value $P_{base}$ according to the timing errors obtained in the first phase. After determining the first basic correction value $P_{base}$, a second phase is entered.

Step S406: determining a plurality of wake-up time for the second phase, performing a second number (e.g. n2 times) of receptions, estimating a timing error for each reception in the second phase, updating the second basic correction value according to a trend of the timing errors recently obtained and determining a first timing correction value according to the minimum of the timing errors obtained in the second phase. To be more specific, the processor 230 may determine a plurality of wake-up time $T_{wakeup}$ before correction according to the aforementioned TBTT, and determine a plurality of wake-up time that have been corrected in the second phase in the power-saving mode according to the first basic correction value $P_{base}$ and a second basic correction value $I_{coarse}$. The physical layer circuit 210 (including the transceiver circuit 211) may be repeatedly awakened according to the wake-up time in the second phase to receive a beacon frame. When each reception is completed, the processor 230 may estimate a corresponding timing error. For example, the processor 230 may estimate the corresponding timing error according to the equation Eq. (1) illustrated above. According to an embodiment, the second basic correction value $I_{coarse}$ may be initially set to a corresponding initial value, for example, the initial value may be zero. After estimating the latest timing error, the processor 230 may repeatedly update the second basic correction value $I_{coarse}$ according to a trend of the timing errors recently obtained, such that the next wake-up time may be adjusted in real-time according to the timing errors recently obtained. After the second number (n2) of receptions are completed, the processor 230 may determine the first timing correction value $\Delta T_{correct\_phase2}$ according to the minimum of the timing errors obtained in the second phase. After determining the first timing correction value $\Delta T_{correct\_phase2}$, a third phase is entered.

Step S408: determining a plurality of wake-up time for the third phase, performing a third number (e.g. n3 times) of receptions, estimating a timing error for each reception in the third phase, and updating a third basic correction value according to a trend of the timing errors recently obtained. To be more specific, the processor 230 may determine a plurality of wake-up time $T_{wakeup}$ before correction according to the aforementioned TBTT, and determine a plurality of wake-up time that have been corrected in the third phase in the power-saving mode according to the first timing correction value $\Delta T_{correct\_phase2}$ and the third basic correction value $I_{precise}$. The physical layer circuit 210 (including the transceiver circuit 211) may be repeatedly awakened according to the wake-up time in the third phase to receive a beacon frame. When each reception is completed, the processor 230 may estimate a corresponding timing error. For example, the processor 230 may estimate the corresponding timing error according to the equation Eq. (1) illustrated above. According to an embodiment, the third basic correction value $I_{precise}$ may be initially set to a corresponding initial value, for example, the initial value may be zero. After estimating the latest timing error, the processor 230 may repeatedly update the third basic correction value $I_{precise}$ according to a trend of the timing errors recently obtained, determine a second timing correction value $\Delta T_{correct\_phase3}$ according to the first timing correction value $\Delta T_{correct\_phase2}$ and the third basic correction value $I_{precise}$, and apply the second timing correction value $\Delta T_{correct\_phase3}$ in correcting the next wake-up time as the aforementioned equation Eq. (2), such that the next wake-up time may be adjusted in real-time according to the timing correction value recently obtained.

In the embodiments of the invention, when it is determined that no data that has to be received by the communication device 200 is buffered at the AP side based on the content of the beacon frame, the communication device 200 may keep operating in the third phase in the power-saving mode, repeatedly adjust the next wake-up time $T_{wakeup}$ in real-time according to the timing correction value recently obtained and operate stably according to the adequately adjusted wake-up time. In addition, according to an embodiment of the invention, when the processor 230 determines that loss of beacon frame has occurred or when excessive timing error appears, the communication device 200 may leave the third phase and return back to the first phase (step S404) to sequentially re-determine the first basic correction value $P_{base}$, the second basic correction value $I_{coarse}$ and the third basic correction value $I_{precise}$, so as to determine a better timing correction value $\Delta T_{correct}$.

Figure 5:
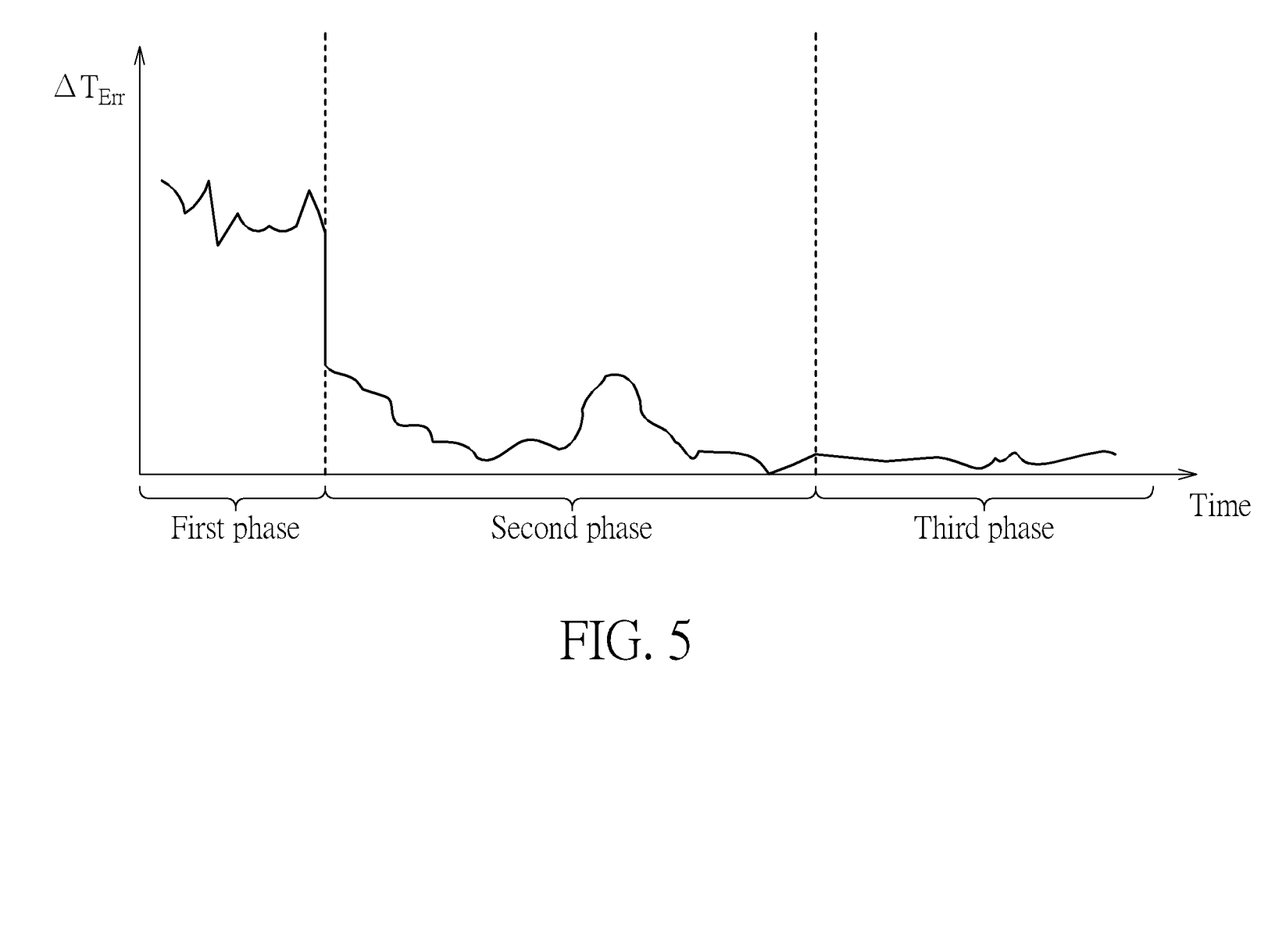
FIG. 5 is a schematic diagram showing the values of the timing error estimated in different phases according to an embodiment of the invention.

FIG. 5 is a schematic diagram showing the values of the timing error $\Delta T_{Err}$ estimated in different phases according to an embodiment of the invention. By continuously and dynamically adjusting the wake-up time in the first, second and third phases based on the timing errors obtained in real-time with different adjustment steps, the values of the timing error $\Delta T_{Err}$ are gradually reduced. In this manner, the power consumption of the communication device in the power-saving mode can be effectively reduced and the occurrence of beacon frame loss can be effectively reduced as well.

In the following paragraphs, the operations of the communication device in the first phase, the second phase and the third phase will be illustrated in more detailed.

Figure 6:
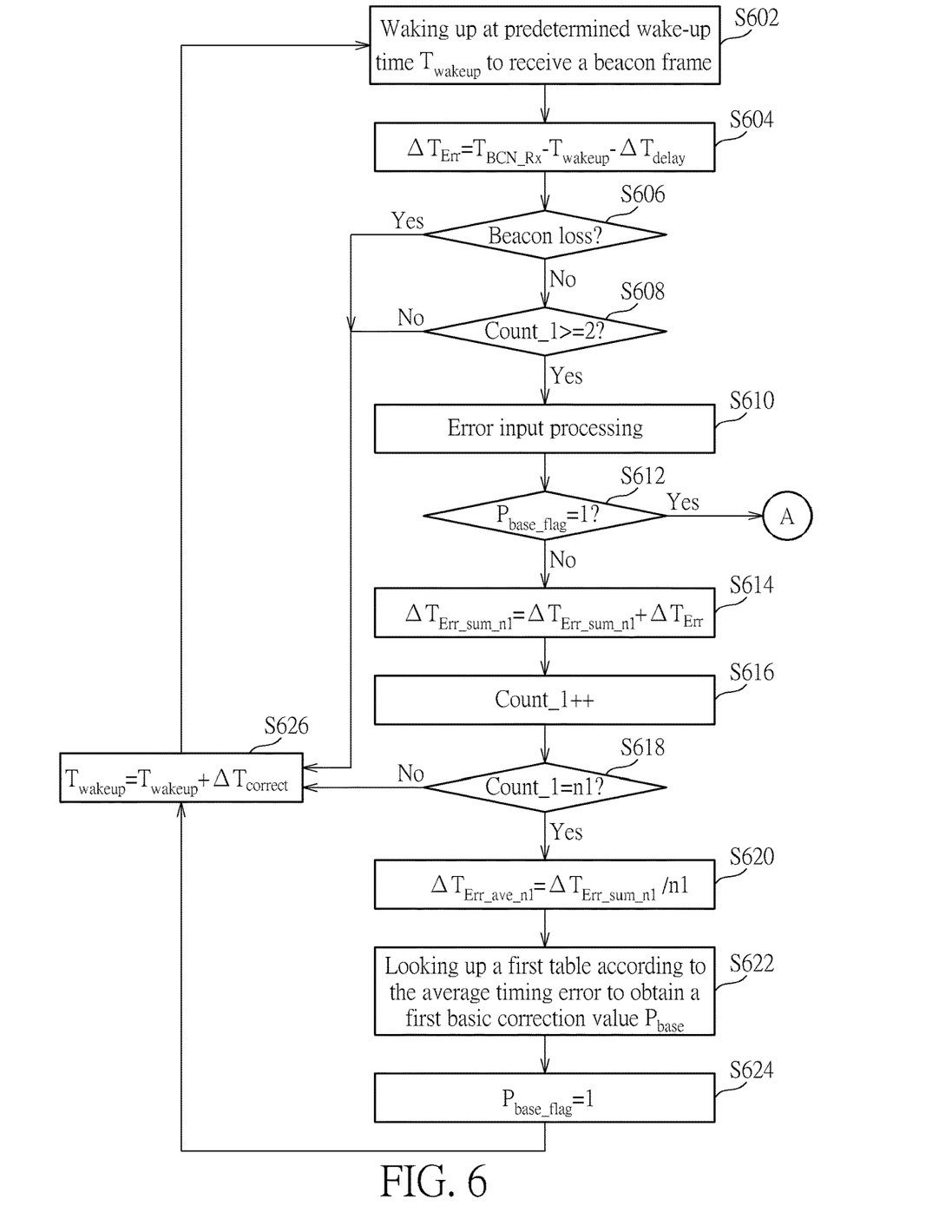
FIG. 6 is a flow chart of the method for dynamically adjusting wake-up time in the first phase according to an embodiment of the invention.

FIG. 6 is a flow chart of the method for dynamically adjusting wake-up time according to an embodiment of the invention. In FIG. 6, detailed operations of the communication device in the first phase are shown. Before operating in the first phase, the processor 230 may reset a first count value Count_1 to zero, reset a first timing error sum $\Delta T_{Err\_sum\_n1}$ to zero and set the flag parameter $P_{base\_flag}$ to zero. In the first phase, the transceiver circuit 211 may be repeatedly awakened to perform a first number n1 of receptions, and after estimating the timing error $\Delta T_{Err}$ for each reception, the processor 230 may select a smaller one from two timing errors corresponding to last two receptions and update the first timing error sum $\Delta T_{Err\_sum\_n1}$ according to the selected smaller one. After performing the first number n1 of receptions, the processor 230 may determine the first basic correction value $P_{base}$ according to an average obtained based on the first timing error sum $\Delta T_{Err\_sum\_n1}$. The detailed operations will be illustrated in the following steps:

Step SS602: waking up the physical layer circuit 210 (including the transceiver circuit 211) at predetermined wake-up time $T_{wakeup}$ to receive a beacon frame. In the embodiments of the invention, the wake-up mechanism of the communication device may be triggered by the corresponding hardware circuit. For example, the processor 230 may issue an interrupt signal for informing the MAC layer circuit 220 of triggering the wake-up mechanism at the corresponding time.

Step S604: estimating the timing error $\Delta T_{Err}$ by the processor 230 for the current reception according to the latest wake-up time and the content of the received beacon frame. For example, the timing error may be estimated according to the equation Eq. (1), wherein the time delay $\Delta T_{delay}$ is a known value, and the time $T_{BCN\_Rx}$ when the beacon frame is received may be set to the TSF value carried in the data body of the currently received beacon frame.

Step S606: determining whether beacon loss has occurred by the processor 230. According to an embodiment of the invention, if the beacon frame cannot be successfully received in this reception, the MAC layer circuit 220 or the physical layer circuit 210 may issue an interrupt signal to inform the processor 230 that beacon loss has occurred. Or, the processor 230 may determine whether beacon loss has occurred according to the value of timing error $\Delta T_{Err}$ obtained in step S604. If beacon loss has occurred, the value of timing error $\Delta T_{Err}$ may be a negative value since the time $T_{BCN\_Rx}$ when the beacon frame is received may be still set as the TSF value carried in the data body of a previously received beacon frame. The processor 230 may determine whether beacon loss has occurred by determining whether value of timing error $\Delta T_{Err}$ obtained in step S604 is a negative value. If not, step S608 is performed. If so, step S626 is performed. That is, the processor 230 may directly wait for the next reception.

Step S608: determining whether the first count value Count_1 is greater than or equal to two by the processor 230. If not, step S626 is performed to directly wait for the next reception. If so, step S610 is performed.

Step S610: performing error input processing by the processor 230. According to an embodiment of the invention, the processor 230 may record the corresponding timing error $\Delta T_{Err}$ in the memory device 232 or the internal buffer memory (not shown) of the processor 230/micro-control unit 231 for each reception. The processor 230 may select a smaller one from two timing errors corresponding to last two receptions as the current input of the parameter adjusting model. For example, the processor 230 may collect two timing errors $\Delta T_{Err\_1}$ and $\Delta T_{Err\_2}$ corresponding to two successive receptions performed most recently and take the smaller one $E_{min}$ of these two timing errors as the current input, that is, $\Delta T_{Err}=E_{min}$.

Step S612: determining whether the flag parameter $P_{base\_flag}$ is set to 1 by the processor 230. If so, the processor 230 ends the operations in the first phase and starts the operations in the second phase (shown as the connection point A in FIG. 6). If not, step S614 is performed.

Step S614: accumulating the timing error as equation Eq. (3) by the processor 230 to update the first timing error sum $\Delta T_{Err\_sum\_n1}$.

$$\Delta T_{Err\_sum\_n1}=\Delta T_{Err\_sum\_n1}+\Delta T_{Err} \quad \text{Eq. (3)}$$

Step S616: updating the first count value Count_1 by the processor 230.

Step S618: determining whether the first count value Count_1 is equal to the first number n1. If so, the communication device has completed the first number of reception and step S620 is performed. If not, step S626 is performed.

Step S620: calculating an average based on the first timing error sum $\Delta T_{Err\_sum\_n1}$ as equation Eq. (4).

$$\Delta T_{Err\_ave\_n1}=\Delta T_{Err\_sum\_n1}/n1 \quad \text{Eq. (4)}$$

Step S622: looking up a first table according to the average timing error $\Delta T_{Err\_ave\_n1}$ by the processor 230 to obtain a first basic correction value $P_{base}$. According to an embodiment of the invention, the first table may be a pre-established lookup table for recording an adequate basic correction value corresponding to each average timing error or each range of average timing error. The adequate basic correction values may be the results obtained by testing the each product.

Step S624: setting the flag parameter $P_{base\_flag}$ to 1 by the processor 230 for representing that the proportional adjustment in the first phase is completed.

Step S626: deriving the next wake-up time by the processor 230 according to the equation Eq. (2). In the operations in the first phase, the processor 230 does not perform wake-up time correction. That is, $\Delta T_{correct} = \Delta T_{correct\_phase1} = 0$. Therefore, in the first phase, the timing correction value $\Delta T_{correct\_phase1}$ is kept being set to zero.

Since the communication device is now operating in the power-saving mode, the physical layer circuit 210 may return to sleep when the current reception is completed, and the processor 230 may wake up the physical layer circuit 210 to perform the next reception at the next wake-up time $T_{wakeup}$.

Figure 7:
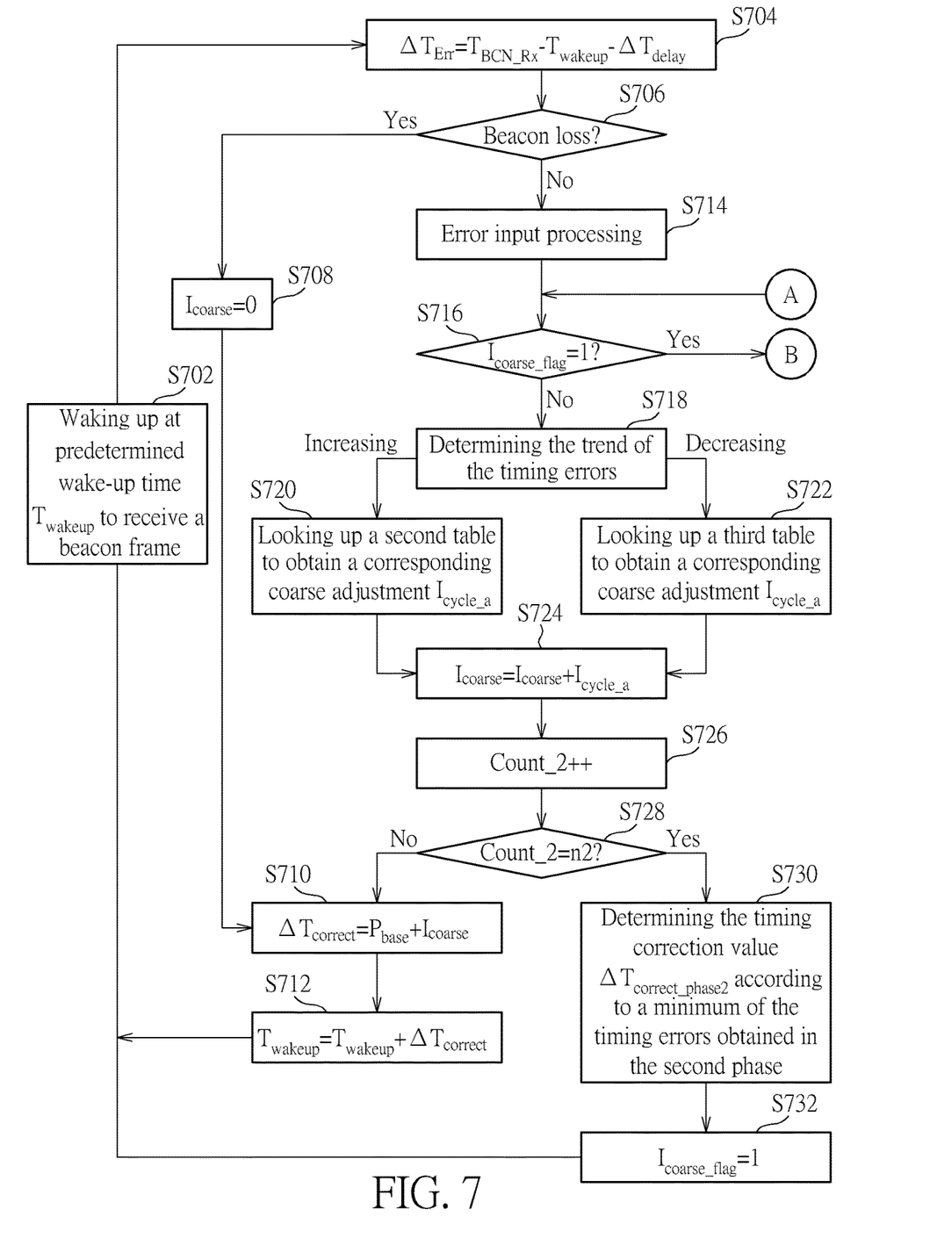
FIG. 7 is a flow chart of the method for dynamically adjusting wake-up time in the second phase according to an embodiment of the invention.

FIG. 7 is a flow chart of the method for dynamically adjusting wake-up time according to an embodiment of the invention. In FIG. 7, detailed operations of the communication device in the second phase are shown.

Before operating in the second phase, the processor 230 may reset a second count value Count_2 to zero, set the initial value of a second basic correction value $I_{coarse}$ to zero and set the flag parameter $I_{coarse\_flag}$ to zero. In the second phase, the transceiver circuit 211 may be repeatedly awakened to perform a second number n2 of receptions, and after estimating the timing error $\Delta T_{Err}$ for each reception, the processor 230 may determine a trend of the timing errors based on the timing errors recently obtained and select a coarse adjustment $I_{cycle\_a}$ to update the second basic correction value $I_{coarse}$. The update of the second basic correction value $I_{coarse}$ may be repeatedly performed every time after the timing error $\Delta T_{Err}$ is determined, and the latest obtained second basic correction value $I_{coarse}$ may be applied in adjusting/correcting the wake-up time for the next wake-up. After performing the second number n2 of receptions, the processor 230 may determine the first timing correction value $\Delta T_{correct\_phase2}$ according to the minimum of the timing errors obtained in the second phase. The detailed operations will be illustrated in the following steps:

Step S702: waking up the physical layer circuit 210 (including the transceiver circuit 211) to receive a beacon frame according to the latest wake-up time $T_{wakeup}$. In the embodiments of the invention, the wake-up mechanism of the communication device may be triggered by the corresponding hardware circuit. For example, the processor 230 may issue an interrupt signal for informing the MAC layer circuit 220 of triggering the wake-up mechanism at the corresponding time.

Step S704: estimating the timing error $\Delta T_{Err}$ by the processor 230 for the current reception according to the latest wake-up time and the content of the received beacon frame. For example, the timing error may be estimated according to the equation Eq. (1), wherein the time delay $\Delta T_{delay}$ is a known value, and the time $T_{BCN\_Rx}$ when the beacon frame is received may be set to the TSF value carried in the data body of the currently received beacon frame.

Step S706: determining whether beacon loss has occurred by the processor 230. As discussed above, the processor 230 may determine whether beacon loss has occurred according to the interrupt signal or according to whether the value of timing error $\Delta T_{Err}$ obtained in step S704 is a negative value. If so, step S708 is performed. If not, step S714 is performed.

Step S708: resetting the second basic correction value $I_{coarse}$ to zero. Since the beacon loss means that the current adjustment is too large, resulting in an overshooting situation which causes the communication device to wake up too late to receive the beacon frame, the processor 230 resets the second basic correction value $I_{coarse}$ to zero and directly perform steps S710 and S712 to determine the next wake-up time for receiving the next beacon frame and restart a new cycle for updating the second basic correction value $I_{coarse}$.

Step S710: calculating the timing correction value $\Delta T_{correct}$ by the processor 230 according to the following equation Eq. (5):

$$\Delta T_{correct} = P_{base} + I_{coarse} \qquad \text{Eq. (5)}$$

where the parameter $P_{base}$ utilized in step S710 is the first basic correction value obtained in the first phase, the parameter $\Delta T_{correct}$ utilized in step S710 is the timing correction value currently determined for a next wake-up in the second phase. According to an embodiment of the invention, the processor 230 may record the corresponding timing correction value $\Delta T_{correct}$ in the memory device 232 or the internal buffer memory (not shown) of the processor 230/microcontrol unit 231 for each reception.

Step S712: deriving the next wake-up time by the processor 230 according to the equal Eq. (2) and returning to step S702.

As discussed above, since the communication device is now operating in the power-saving mode, the physical layer circuit 210 may return to sleep when the current reception is completed, and the processor 230 may wake up the physical layer circuit 210 to perform the next reception at the next wake-up time $T_{wakeup}$.

Step S714: performing error input processing by the processor 230. As discussed above, the processor 230 may select a smaller one from two timing errors corresponding to last two receptions as the current input of the parameter adjusting model. For example, the processor 230 may collect two timing errors $\Delta T_{Err\_1}$ and $\Delta T_{Err\_2}$ corresponding to two successive receptions performed most recently and take the smaller one $E_{min}$ of these two timing errors as the current input, that is, $\Delta T_{Err} = E_{min}$.

Step S716: determining whether the flag parameter $I_{coarse\_flag}$ is set to 1. If so, the processor 230 ends the operations in the second phase and starts the operations in the third phase (shown as the connection point B in FIG. 7). If not, step S718 is performed.

Step S718: determining the trend of the timing errors by the processor 230 according to three most recently obtained timing errors. Here, the trend of the timing errors is utilized for updating the second basic correction value $I_{coarse}$. In the embodiments of the invention, the processor 230 may determine the trend of the timing errors by determining whether input values are increasing or decreasing according to the sequence of the smaller two of three consecutive input values. To be more specific, for three consecutive timing errors $\Delta T_{Err\_1}$, $\Delta T_{Err\_2}$ and $\Delta T_{Err\_3}$ currently obtained, the smaller ones obtained by performing error input processing in step S714 based on their sequence is $E_{min1}$ and $E_{min2}$. The processor 230 may determine the trend of the timing errors based on the following rules:

If $E_{min1} < E_{min2}$, determining that the trend of the timing errors is increasing;

If $E_{min1} > E_{min2}$, determining that the trend of the timing errors is decreasing.

When the processor 230 determines that the timing errors are increasing, step S720 is performed. When the processor 230 determines that the timing errors are decreasing, step S722 is performed.

Step S720: looking up a second table according to the current input timing error $\Delta T_{Err}$ by the processor 230 to obtain a corresponding coarse adjustment $I_{cycle\_a}$ when the trend of the timing error is increasing.

Step S722: looking up a third table according to the current input timing error $\Delta T_{Err}$ by the processor 230 to obtain a corresponding coarse adjustment $I_{cycle\_a}$ when the trend of the timing error is decreasing.

According to an embodiment of the invention, the second table and the third table may be pre-established lookup tables for recording an adequate coarse adjustment $I_{cycle\_a}$ corresponding to each timing error or each range of timing error. The coarse adjustment $I_{cycle\_a}$ may be the result obtained by testing the each product.

Step S724: updating the second basic correction value $I_{coarse}$ by the processor 230 according to the obtained coarse adjustment $I_{cycle\_a}$. The processor 230 may accumulate the values of the coarse adjustment $I_{cycle\_a}$ as the following equation Eq. (6) to obtain the second basic correction value $I_{coarse}$. In other words, the processor 230 may update the second basic correction value $I_{coarse}$ by adding the coarse adjustment $I_{cycle\_a}$ to the second basic correction value $I_{coarse}$.

$$I_{coarse} = I_{coarse} + I_{cycle\_a} \qquad \text{Eq. (6)}$$

Step S726: updating the second count value Count_2 by the processor 230.

Step S728: determining whether the second count value Count_2 is equal to the second number n2 by the processor 230. If so, the communication device 200 has finished the second number n2 of receptions, and step S730 is performed. If not, step S710 is performed.

Step S730: determining the first timing correction value $\Delta T_{correct\_phase2}$ according to the minimum of the timing errors obtained in the second phase. As discussed above, the processor 230 may record the corresponding timing correction value $\Delta T_{correct}$ and timing error $\Delta T_{Err}$ for each reception. The processor 230 may select a timing correction value $\Delta T_{correct}$ that can minimize the timing error $\Delta T_{Err}$ as the first timing correction value $\Delta T_{correct\_phase2}$ obtained in the second phase. In the embodiments of the invention, the processor 230 may select the timing correction value of a reception with the minimum timing error $\Delta T_{Err}$ and without beacon loss as the output timing correction value.

Step S732: setting the flag parameter $I_{coarse\_flag}$ to 1 by the processor 230 for representing that the time integral coarse adjustment in the second phase is completed, and returning to step S702.

As shown in FIG. 7, in the second phase, the processor 230 may repeatedly select the coarse adjustment $I_{cycle\_a}$ to be accumulated according to the current timing error and calculate the timing correction value $\Delta T_{correct} = P_{base} + I_{coarse}$ for the next operation period. It should be noted that the aforementioned timing values calculated during the timing correction are all absolute values, and the timing correction is equivalent to delaying the wake-up time $T_{wakeup}$ from the wake-up time point M to the right (to the right side of the time axis as shown in FIG. 1) in each correction. If beacon loss has occurred during the timing correction procedure, the second basic correction value $I_{coarse}$ obtained by accumulating the coarse adjustments should be reset to zero and the accumulation of the second basic correction value $I_{coarse}$ should be restarted.

In the second phase, by repeatedly and dynamically adjusting the timing correction value according to the current timing error and the trend of the timing errors, the corrected wake-up time can be applied in real-time in the next wake-up, and the timing error will coverage through the iteration in the aforementioned procedure.

Figure 8:
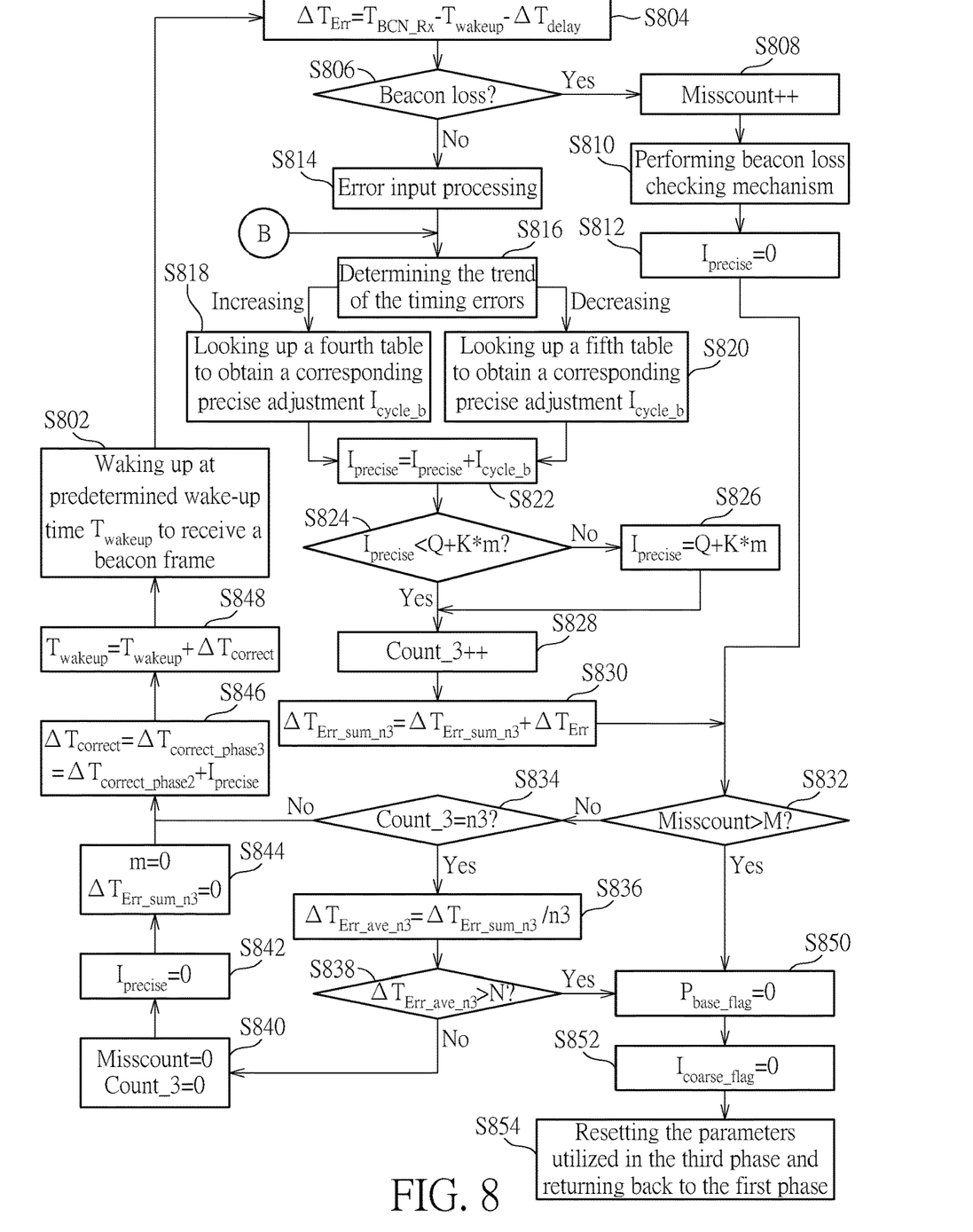
FIG. 8 is a flow chart of the method for dynamically adjusting wake-up time in the third phase according to an embodiment of the invention.

FIG. 8 is a flow chart of the method for dynamically adjusting wake-up time according to an embodiment of the invention. In FIG. 8, detailed operations of the communication device in the third phase are shown. Before operating in the third phase, the processor 230 may reset a third count value Count_3 to zero, set the initial value of a third basic correction value $I_{precise}$ to zero, set the second timing error sum $\Delta T_{Err\_sum\_n3}$ to zero, and set the number of beacon loss Misscount and the number of compensation for beacon loss m accumulated in the third phase to zero. In the third phase, the transceiver circuit 211 may be repeatedly awakened to perform a third number n3 of receptions, and after estimating the timing error $\Delta T_{Err}$ for each reception, the processor 230 may determine a trend of the timing errors based on the timing errors recently obtained and select a precise adjustment $I_{cycle\_b}$ to update the third basic correction value $I_{precise}$. The update of the third basic correction value $I_{precise}$ may be repeatedly performed every time after the timing error $\Delta T_{Err}$ is determined, and the latest obtained third basic correction value $I_{precise}$ may be applied in real-time in adjusting/correcting the wake-up time for the next wake-up. After performing the second number n3 of receptions, the processor 230 may reset the third basic correction value $I_{precise}$ to its initial value (for example, zero) and restart a new correction cycle. In the embodiments of the invention, when there is no data that has to be received by the communication device 200 buffered in the AP and the number of beacon loss is less than a predetermined number, the communication device 200 may keep operating in the third phase in the power-saving mode for repeatedly adjusting the next wake-up time $T_{wakeup}$ according to the latest timing correction value, so as to operate stably according to the adequately adjusted wake-up time. The detailed operations will be illustrated in the following steps:

Step S802: waking up the physical layer circuit 210 (including the transceiver circuit 211) to receive a beacon frame according to the latest wake-up time $T_{wakeup}$. In the embodiments of the invention, the wake-up mechanism of the communication device may be triggered by the corresponding hardware circuit. For example, the processor 230 may issue an interrupt signal for informing the MAC layer circuit 220 of triggering the wake-up mechanism at the corresponding time.

Step S804: estimating the timing error $\Delta T_{Err}$ by the processor 230 for the current reception according to the latest wake-up time and the content of the received beacon frame. For example, the timing error may be estimated according to the equation Eq. (1), wherein the time delay $\Delta T_{delay}$ is a known value, and the time $T_{BCN\_Rx}$ when the beacon frame is received may be set to the TSF value carried in the data body of the currently received beacon frame.

Step S806: determining whether beacon loss has occurred by the processor 230. As discussed above, the processor 230 may determine whether beacon loss has occurred according to the interrupt signal or according to whether the value of timing error $\Delta T_{Err}$ obtained in step S704 is a negative value. If so, step S808 is performed. If not, step S814 is performed.

Step S808: updating the number of beacon loss Misscount by the processor 230.

Step S810: performing a beacon loss checking mechanism by the processor 230. When performing the beacon loss checking mechanism, the processor 230 selectively change the timing correction value $\Delta T_{correct}$ according to the latest obtained number of consecutive beacon loss MissNumber until a beacon frame can be successfully received. That is, the beacon loss checking mechanism will be ended when a beacon frame is successfully received. Detailed of the beacon loss checking mechanism is illustrated as follows:

At the time when the beacon loss checking mechanism is started, the number of consecutive beacon loss MissNumber is reset to zero. The number of consecutive beacon loss MissNumber is utilized for calculating a total number of consecutive beacon loss during the time period when performing the beacon loss checking mechanism. Suppose that the clock signal adjustment unit of the communication device 200 is K micro-second, where the clock signal adjustment unit is the smallest adjustable time unit of the clock signal, which is related to the error rate or accuracy of the clock signal. The operations when the number of consecutive beacon loss MissNumber satisfies different conditions are listed as follows:

When MissNumber≤1, the timing correction value $\Delta T_{correct}$ will not be adjusted. The wake-up time for waking up the transceiver circuit 211 in the next operation period is set as the original wake-up time, where the original wake-up time $T_{wakeup}$ is the wake-up time of a previous reception when the beacon frame has been successfully received.

When 1<MissNumber≤3, the timing correction value $\Delta T_{correct}$ is adjusted as $\Delta T_{correct}=\Delta T_{correct}-K$, and the wake-up time $T_{wakeup}$ for the next operation period will be updated as equation Eq. (2) based on this timing correction value. No matter whether the beacon frame is received at the wake-up time, the power-saving mode will be entered.

When 3<MissNumber≤5, the timing correction value $\Delta T_{correct}$ is adjusted as $\Delta T_{correct}=\Delta T_{correct}-K$, and the wake-up time $T_{wakeup}$ for the next operation period will be updated as equation Eq. (2) based on this timing correction value. The transceiver circuit 211 will be awakened at the next wake-up time to actively transmit a request data fame to the AP. If there no further data transmission for a specific time period (shorter than the sleep period) or when the data transmission is completed, the transceiver circuit 211 will sleep again and will be awakened at the new wake-up time $T_{wakeup}$ to receive the beacon frame.

When MissNumber>5, the processor 230 will actively wake up the transceiver circuit 211 and keep making the communication device 200 to operate in the Active state until a beacon frame is successfully received. When the beacon frame is successfully received and the re-synchronization is completed, the third phase is returned.

It should be noted that the operations corresponding to different numbers of consecutive beacon loss MissNumber may be flexibly designed based on different system requirements. Therefore, the above description is only used to illustrate the concept of the invention, not to limit the scope of the invention. In addition, according to an embodiment of the invention, when a beacon frame is received after the beacon loss checking mechanism is applied, the number of consecutive beacon loss MissNumber has to be reset to zero.

In addition, every time when the processor adjusts the timing correction value $\Delta T_{correct}$ as $\Delta T_{correct}=\Delta T_{correct}-K$, the processor 230 should add one to the number of compensation for beacon loss m, so as to record the number of compensation for beacon loss.

Step S812: resetting the third basic correction value $I_{precise}$ to zero.

Step S814: performing error input processing by the processor 230. As discussed above, the processor 230 may select a smaller one from two timing errors corresponding to last two receptions as the current input of the parameter adjusting model.

Step S816: determining the trend of the timing errors by the processor 230 according to three recently obtained timing errors. Here, the trend of the timing errors is utilized for updating the third basic correction value $I_{precise}$. As discussed above, the processor 230 may determine the trend of the timing errors by determining whether input values are increasing or decreasing according to the sequence of the smaller two of the three consecutive input values. When the trend of the timing errors is increasing, step S818 is performed. When the trend of the timing errors is decreasing, step S820 is performed.

Step S818: looking up a fourth table according to the current input timing error $\Delta T_{Err}$ by the processor 230 to obtain a corresponding precise adjustment $I_{cycle\_b}$ when the trend of the timing error is increasing.

Step S820: looking up a fifth table according to the current input timing error $\Delta T_{Err}$ by the processor 230 to obtain a corresponding precise adjustment $I_{cycle\_b}$ when the trend of the timing error is decreasing.

Step S822: updating the third basic correction value $I_{precise}$ by the processor 230 according to the obtained precise adjustment $I_{cycle\_b}$. The processor 230 may update the third basic correction value $I_{precise}$ by adding the precise adjustment $I_{cycle\_b}$ to the third basic correction value $I_{precise}$ as the following equation Eq. (7).

$$I_{precise}=I_{precise}+I_{cycle\_b} \qquad \text{Eq. (7)}$$

In other words, the processor 230 may update the third basic correction value $I_{precise}$ by adding the precise adjustment $I_{cycle\_b}$ to the third basic correction value $I_{precise}$.

Step S824: determining whether the third basic correction value $I_{precise}$ is too large.

According to an embodiment of the invention, suppose that the amount of compensation for the timing correction value $\Delta T_{correct}$ is K*m, where m is the number of compensation for beacon loss in this phase, and further considering that the accuracy of the clock in communication device 200 is Q, the third basic correction value $I_{precise}$ should be controlled during the whole timing correction procedure to satisfy the following equation Eq. (8) to avoid overshooting the wake-up time:

$$I_{precise}<Q+K*m \qquad \text{Eq. (8)}$$

If equation Eq. (8) is not satisfied, it means that the third basic correction value $I_{precise}$ currently obtained is too large, and step S826 is performed. If equation Eq. (8) is satisfied, step S828 is performed.

Step S826: setting the third basic correction value $I_{precise}$ according to the following equation Eq. (9).

$$I_{precise}=Q+K*m \qquad \text{Eq. (9)}$$

Step S828: updating the third count value Count_3 by the processor 230.

Step S830: accumulating the timing error by the processor 230 according to the following equation Eq. (10) to update the second timing error sum $\Delta T_{Err\_sum\_n3}$.

$$\Delta T_{Err\_sum\_n3}=\Delta T_{Err\_sum\_n3}+\Delta T_{Err} \qquad \text{Eq. (10)}$$

Step S832: determining whether the number of beacon loss Misscount accumulated in the third phase is greater than an indicator M, where the value of the indicator M may be set based on system requirement. If so, step S850 is performed. If not, step S834 is performed.

Step S834: determining whether the third count value Count_3 is equal to the third number n3. If so, the communication device 200 has finished the third number n3 of receptions, and step S836 is performed. If not, step S846 is performed.

In the third phase, the processor 230 may keep monitoring the number of beacon loss Misscount and the total number of beacon reception (that is, the third count value Count_3) and accumulating the number of beacon loss Misscount and the second timing error sum $\Delta T_{Err\_sum\_n3}$. When the accumulated number of beacon loss Misscount is greater than the indicator M before the third count value Count_3 is equal to the third number n3, the flag parameter $P_{base\_flag}$ and $I_{coarse\_flag}$ and the parameters utilized in the third phase should all be reset, and the first phase is returned to restart the cycle of adjustments in three phases (step S850~S854). If the accumulated number of beacon loss Misscount is not greater than the indicator M and the third count value Count_3 is equal to the third number n3, an average of the second timing error sum $\Delta T_{Err\_sum\_n3}$ currently accumulated is calculated.

Step S836: calculating an average of the second timing error sum $\Delta T_{Err\_sum\_n3}$ by the processor 230 according to the following equation Eq. (11)

$$\Delta T_{Err\_ave\_n3} = \Delta T_{Err\_sum\_n3}/n3 \qquad \text{Eq. (11)}$$

Step S838: determining whether the average $\Delta T_{Err\_ave\_n3}$ is greater than an indicator N, where the value of the indicator N may be set based on system requirement. If so, the flag parameter $P_{base\_flag}$ and $I_{coarse\_flag}$ and the parameters utilized in the third phase should all be reset, and the first phase is returned to restart the cycle of adjustments in three phases (step S850~S854). If not, step S840 is performed in which only the parameters utilized in the third phase are reset.

Step S840: resetting the number of beacon loss Misscount and the third count value Count_3 to zero by the processor 230.

Step S842: resetting the third basic correction value $I_{precise}$ to zero by the processor 230.

Step S844: resetting the number of compensation for beacon loss m and the second timing error sum $\Delta T_{Err\_sum\_n3}$ to zero by the processor 230.

Step S846: calculating the current correction value (that is, the second timing correction value $\Delta T_{correct\_phase3}$) according to the first timing correction value $\Delta T_{correct\_phase2}$ obtained in the second phase and the third basic correction value $I_{precise}$ obtained in the third phase, and updating the timing correction value $\Delta T_{correct}$ for a next operation period based on the current timing correction value as the following equation Eq. (12):

$$\Delta T_{correct} = \Delta T_{correct\_phase3} = \Delta T_{correct\_phase2} + I_{precise} \qquad \text{Eq. (12)}$$

So far, the time integral precise adjustment in the third phase has completed.

Step S848: deriving the wake-up time for the next wake-up by the processor 230 according to equation Eq. (2), and returning to step S802. The processor 230 will wake up the physical layer circuit 210 to perform the next reception when the next wake-up time $T_{wakeup}$ comes.

Step S850: resetting the flag parameter $P_{base\_flag}$ by the processor 230.

Step S852: resetting the flag parameter $I_{coarse\_flag}$ by the processor 230.

Step S854: resetting all the parameters utilized in the third phase by the processor 230 and returning back to the first phase to restart the cycle of adjustments in three phases. In the embodiments of the invention, the parameters that have to be reset comprise the parameters utilized in the beacon loss checking mechanism, including the number of consecutive beacon loss MissNumber, the accumulated number of beacon loss Misscount, the number of compensation m on the timing correction value $\Delta T_{correct}$, and the parameters utilized in the three phase adjustments, including the first timing error sum $\Delta T_{Err\_sum\_n1}$ and the first count value Count_1 utilized in the first phase, the second count value Count_2 and the second basic correction value $I_{coarse}$ utilized in the second phase, and the third count value Count_3, the timing error sum $\Delta T_{Err\_sum\_n3}$, the third basic correction value $I_{precise}$ and the timing correction value $\Delta T_{correct}$ utilized in the third phase. After resetting the parameters, the cycle of three phase adjustments is restarted.

As shown in FIG. 8, in the third phase, before the third count value Count_3 is equal to the third number n3, the processor may repeatedly select the precise adjustment $I_{cycle\_b}$ to be accumulated according to the current timing error, and calculate the timing correction value $\Delta T_{correct} = \Delta T_{correct\_phase2} + I_{precise}$ for the next operation period. By repeatedly adjusting the timing correction value according to the current timing error and the trend of the timing errors, the timing error will coverage through the iteration in the aforementioned procedure. Similarly, the aforementioned timing values calculated during the timing correction are all absolute values, and the timing correction is equivalent to delaying the wake-up time $T_{wakeup}$ from the wake-up time point M to the right (to the right side of the time axis as shown in FIG. 1) in each correction. If beacon loss has occurred during the timing correction procedure, the third basic correction value $I_{precise}$ obtained by accumulating the coarse adjustments should be reset to zero and the accumulation of the third basic correction value $I_{precise}$ should be restarted. In addition, if the beacon is lost too many times or the average timing error is too large, the process will return to the first stage and restart the cycle of three phase adjustments. If the above situation is not met, when the third count value Count_3 is equal to the third number n3, the third basic correction value $I_{precise}$ and the count value used in the third phase are reset to zero, and the cycle of updating the third basic correction value $I_{precise}$ is restarted.

Compared with the prior art, the proposed method can determine how to adjust the wake-up time according to the trend of the timing errors input to the parameter adjusting model, and a reasonable processing mechanism for processing input errors (such as the aforementioned error input processing) and the beacon loss checking mechanism are also incorporated in the proposed method. The proposed method is instantaneous and self-adjustable, and has the advantages of a small amount of calculation, fast response speed, and high accuracy. In addition, by adequately adjusting the wake-up time, the communication device can operate in the best power-saving state, effectively solving the problems of excessive power consumption when the timing error $\Delta T_{Err}$ is large and beacon loss in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
   a transceiver circuit, configured to receive a plurality of wireless signals; and
   a processor, configured to wake up the transceiver circuit to receive one or more beacon frames after entering a power-saving mode;
   wherein in a first phase in the power-saving mode, the processor is configured to determine a plurality of wake-up time according to a beacon interval, control the transceiver circuit to perform a first number of receptions according to the determined wake-up time, estimate a timing error for each reception in the first phase and determine a first basic correction value according to the timing errors obtained in the first phase,
   in a second phase in the power-saving mode, the processor is configured to determine a plurality of wake-up time according to the beacon interval, the first basic correction value and a second basic correction value, control the transceiver circuit to perform a second number of receptions according to the determined wake-up time, estimate a timing error for each reception in the second phase, determine a first timing correction value according to the timing errors obtained in the second phase, wherein the processor is further configured to update the second basic correction value according to a trend of the timing errors recently obtained, and
   in a third phase in the power-saving mode, the processor is configured to determine a plurality of wake-up time according to the beacon interval, the first timing correction value and a third basic correction value, control the transceiver circuit to perform a third number of receptions according to the determined wake-up time, estimate a timing error for each reception in the third phase, and update the third basic correction value according to a trend of the timing errors recently obtained, wherein the processor is further configured to update the wake-up time in the third phase according to the first timing correction value and the third basic correction value.

2. The communication device of claim 1, wherein after estimating the timing error for each reception in the first phase in the power-saving mode, the processor is further configured to select a smaller one from two timing errors corresponding to last two receptions and update a first timing error sum according to the selected smaller one, and after determining that the transceiver circuit has finished the first number of receptions, the processor is further configured to determine the first basic correction value according to an average obtained based on the first timing error sum.

3. The communication device of claim 1, wherein in the second phase in the power-saving mode, the processor determines the trend of the timing errors according to three recently obtained timing errors and selects a coarse adjustment according to the trend of the timing errors for updating the second basic correction value.

4. The communication device of claim 3, wherein in the second phase in the power-saving mode, the processor updates the second basic correction value by adding the coarse adjustment to the second basic correction value.

5. The communication device of claim 1, wherein in the third phase in the power-saving mode, the processor determines the trend of the timing errors according to three recently obtained timing errors and selects a precise adjustment according to the trend of the timing errors for updating the third basic correction value.

6. The communication device of claim 5, wherein in the third phase in the power-saving mode, the processor updates the third basic correction value by adding the precise adjustment to the third basic correction value.

7. The communication device of claim 1, wherein the third basic correction value is initially set to an initial value in the third phase in the power-saving mode, and when determining that the transceiver circuit has finished the third number of receptions, the processor is further configured reset the third basic correction value to the initial value.

8. The communication device of claim 1, wherein the processor is further configured to determine the first timing correction value according to a minimum of the timing errors obtained in the second phase.

9. A method for dynamically adjusting wake-up time for a communication device comprising a transceiver circuit and a processor, wherein the communication device enters a power-saving mode when a predetermined condition is met, and the method comprises:
   in a first phase in the power-saving mode, determining a plurality of wake-up time according to a beacon interval, performing a first number of receptions according to the determined wake-up time, estimating a timing error of the transceiver circuit for each reception in the first phase and determining a first basic correction value according to the timing errors obtained in the first phase, wherein the transceiver circuit is awakened at the wake-up time in the first phase to receive one or more beacon frames;
   in a second phase in the power-saving mode, determining a plurality of wake-up time according to the beacon interval, the first basic correction value and a second basic correction value, performing a second number of receptions according to the determined wake-up time, estimating a timing error of the transceiver circuit for each reception in the second phase, updating the second basic correction value according to a trend of the timing errors recently obtained and determining a first timing correction value according to the timing errors obtained in the second phase, wherein the transceiver circuit is awakened at the wake-up time in the second phase to receive one or more beacon frames; and
   in a third phase in the power-saving mode, determining a plurality of wake-up time according to the beacon interval, the first timing correction value and a third basic correction value, performing a third number of receptions according to the determined wake-up time, estimating a timing error of the transceiver circuit for each reception in the third phase, updating the third basic correction value according to a trend of the timing errors recently obtained, and updating the wake-up time in the third phase according to the first timing correction value and the third basic correction value, wherein the transceiver circuit is awakened at the wake-up time in the third phase to receive one or more beacon frames.

10. The method of claim 9, further comprising:
   after estimating the timing error for each reception in the first phase in the power-saving mode, selecting a smaller one from two timing errors corresponding to last two receptions and updating a first timing error sum according to the selected smaller one, and wherein the operation of determining the first basic correction value according to the timing errors obtained in the first phase further comprises:
determining the first basic correction value according to an average obtained based on the first timing error sum after the transceiver circuit has finished the first number of receptions.

11. The method of claim 9, wherein the trend of the timing errors utilized for updating the second basic correction value is determined according to three recently obtained timing errors, and wherein the operation of updating the second basic correction value according to the trend of the timing errors recently obtained further comprises:
selecting a coarse adjustment according to the trend of the timing errors for updating the second basic correction value.

12. The method of claim 11, further comprising:
adding the coarse adjustment to the second basic correction value.

13. The method of claim 9, wherein the trend of the timing errors utilized for updating the third basic correction value is determined according to three recently obtained timing errors, and wherein the operation of updating the third basic correction value according to the trend of the timing errors recently obtained further comprises:
selecting a precise adjustment according to the trend of the timing errors for updating the third basic correction value.

14. The method of claim 13, further comprising:
adding the precise adjustment to the third basic correction value.

15. The method of claim 9, further comprising:
in the third phase in the power-saving mode, initially setting the third basic correction value to an initial value, and resetting the third basic correction value to the initial value when determining that the transceiver circuit has finished the third number of receptions.

16. The method of claim 9, wherein the first timing correction value is determined according to a minimum of the timing errors obtained in the second phase.

* * * * *